(No Model.)
J. FLEISCHER.
COOLER FOR CONDENSING WATER.
No. 543,005. Patented July 23, 1895.
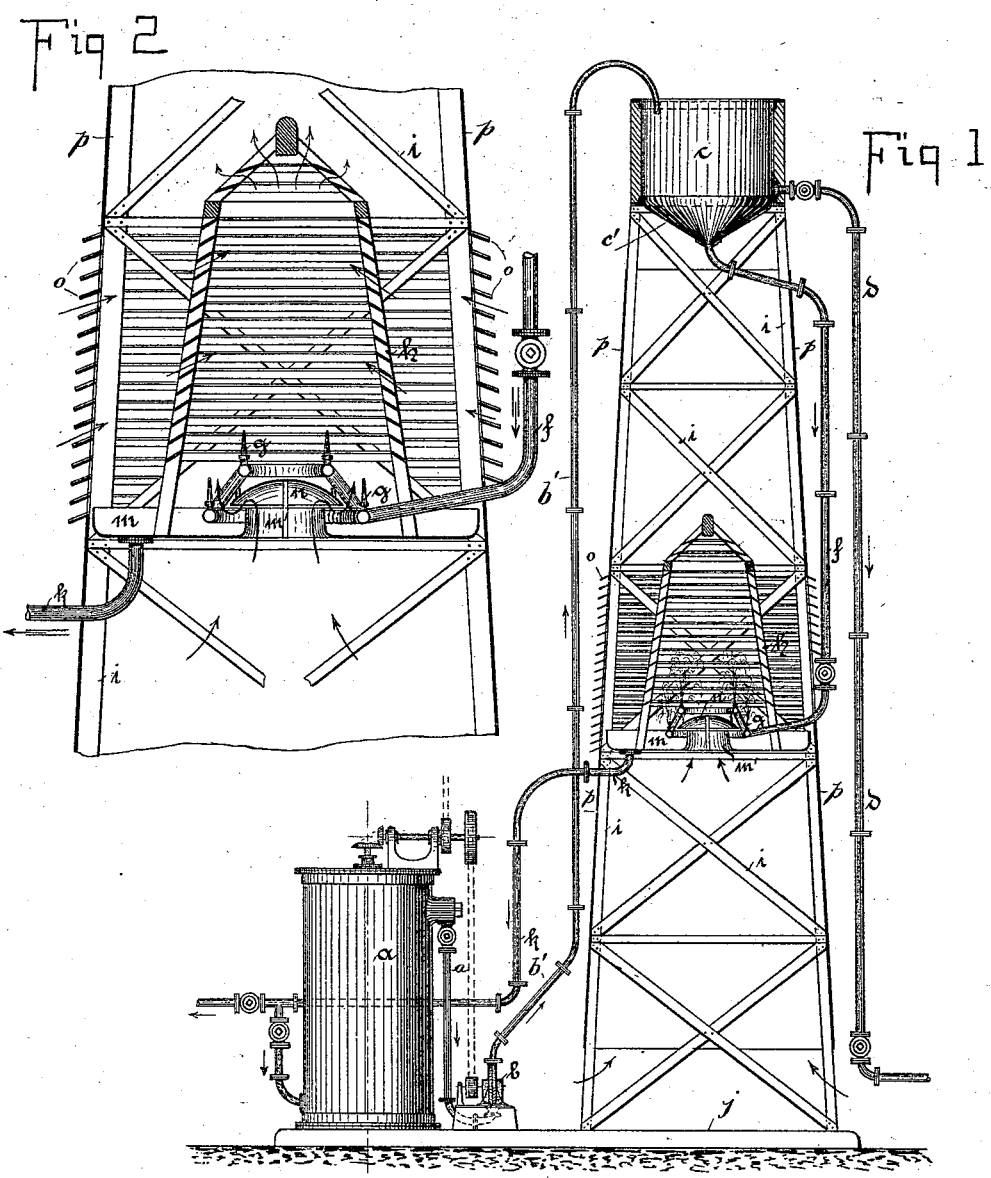

UNITED STATES PATENT OFFICE.

JOHANNES FLEISCHER, OF FRANKFORT-ON-THE-MAIN, GERMANY, ASSIGNOR OF ONE-HALF TO JAMES KOHLSAAT, OF MILWAUKEE, WISCONSIN.

COOLER FOR CONDENSING WATER.

SPECIFICATION forming part of Letters Patent No. 543,005, dated July 23, 1895.

Application filed June 11, 1894. Serial No. 514,207. (No model.)

*To all whom it may concern:*

Be it known that I, JOHANNES FLEISCHER, a subject of the Emperor of Germany, and a resident of Frankfort-on-the-Main, in the Kingdom of Prussia, German Empire, have invented a certain new and useful Improvement in Apparatus for Recooling the Cooling-Water for Use in Steam-Engines and Cooling Constructions, of which the following is a specification.

My invention relates to apparatus for recooling the water used in condensers for steam-engines and cooling constructions, and has for its object to produce a highly-efficient cooling apparatus.

The recooling apparatus heretofore used have recooled the water only to a small degree, leaving it still too hot for use. Hence a greater or less quantity of cool water must be added to the water in the cooler to bring the same down to a temperature at which it will be suitable for use.

Now, in localities where only a small amount of water can be obtained, or at such places where water must be taken from city mains and paid for at high rates, the above-mentioned apparatus will not suffice. I have therefore produced an apparatus which cools the water to nearly the temperature of the atmosphere in order that it may be at the proper temperature to be used over again.

To this end my invention consists in the construction herein set forth, illustrated in the accompanying drawings, and which will be more particularly pointed out in the claims.

In the drawings, Figure 1 is an elevation, partly in section, of a construction embodying one form of my invention. Fig. 2 is a broken-away elevation of the same on an enlarged scale.

In the drawings, $a$ is a condenser or other analogous apparatus, with which communicates an overflow-pipe $a'$, which communicates with a pump $b$. From the pump $b$ a pipe $b'$ leads to an elevated tank $c$. This tank $c$ is mounted upon a tower or framework $i$ and is provided with a cone-shaped bottom $c'$, from the lowest point of which leads a pipe $f$ for carrying off the water from the tank. Connected also to the tank $c$ is a pipe $d$. This pipe also serves to carry off water from the tank. Surrounding the tower $i$ are casings $p\ p$, preferably made of heat-insulating material, which casings begin a short distance above the base $j$ of the tower $i$ and extend continuously to within a short distance of the top of the tower, with the exception of a section at about mid-height of the tower, which is open and provided with slats $o$ arranged shutter-like, which slats may be movable or pivoted if desired.

Mounted within the tower $i$, preferably contiguous to the slatted portion, is a basin $m$, which is perforated at or near its center and provided with a flange or upwardly-projecting casing $m'$. Covering the opening of the casing $m'$ is a cap $n$. Mounted above the basin and within the tower $i$ is an auxiliary tower $h$, whose sides are slatted in the same or similar manner as the sides of the tower $i$. This auxiliary tower $h$ is preferably located within the slatted section of the tower $i$ in such a manner that the air may have a free sweep through both towers. Located within the tower $i$ and by preference within the auxiliary tower $h$ is a spraying device, which may be of any ordinary construction, but which is preferably made up of a series of roses $g$. The pipe $f$ which leads from the elevated tank is connected to the spraying device and forms a conduit from said tank to the spraying device.

Communicating with the basin $m$ is a pipe $k$ or other suitable conduit, which serves to carry off water from the basin and convey it to the condenser or to other suitable water-containing apparatus.

The operation of my device is as follows: The condensing water from the condenser flows out of the condenser by means of the overflow-pipe $a'$ and is forced by the pump $b$ through the pipe $b'$ and discharged into the elevated tank $c$. From the elevated tank it flows through the pipe $f$ to the spraying device in the auxiliary tower $h$ and is there discharged in a more or less finely-divided state. The rush of the hot water, together with the heating of the air contained within the tower $i$, serves to set up a circulation of air therein from the bottom upward to the top before it is discharged, and also through the sides of the slatted sections of the tower. This flow of air serves to cool the water as it is sprayed by direct contact therewith while in the air and by flowing over the water as the water flows over the slatted portion of the tower or towers. It will be observed in this connection that the tower $i$ acts as a sort of chimney for conveying the air, the perforation in the basin and the casing $m'$ allowing a free circulation of the air through tower $h$. The sprayed and cooled water falls into the basin $m$ and is removed through the conduit $k$ and conveyed to the condenser or other receptacle conveniently placed for the purpose.

While I have described a specific apparatus in positive terms I would have it understood that I do not thereby expressly limit myself to the construction and arrangement of devices thus specifically set forth, as other and analogous forms will readily suggest themselves to those who may desire to enjoy the fruits of my invention.

What I claim, and desire to secure by Letters Patent, is—

1. In a cooling apparatus, the combination of a tower and an auxiliary tower severally provided with shutter-like openings, a basin located below the auxiliary tower; a spraying apparatus located above the basin and discharging into one of the towers, and means for conveying the fluid to the spraying apparatus, substantially as described.

2. In a cooling apparatus, the combination of an apertured auxiliary tower $h$, a basin located below said tower, a spraying apparatus located above the basin and provided with a pipe for conveying liquid thereto, and a tower as $i$ inclosing the first mentioned tower, and provided with shutter-like openings, substantially as described.

3. In a cooling apparatus, the combination of an auxiliary tower $h$, a perforated basin located below the tower, a spraying apparatus located above the basin, and provided with means for conveying the fluid thereto, and a tower surrounding the auxiliary tower, substantially as described.

4. In an apparatus for cooling water, the combination of a tower, incased nearly to its top and bottom by heat insulating packing, movable shutter slats forming a portion of the tower casing, and located intermediate of the height of the tower, an auxiliary tower $h$ having fixed shutter slats, and located within the first mentioned tower and in proximity to the slatted section thereof, a spraying apparatus located within the auxiliary tower $h$, a reservoir located above the level of the spraying apparatus and connected thereto by a pipe, and a basin beneath the said spraying apparatus having a flanged opening in its bottom, substantially as described.

JOHANNES FLEISCHER.

Witnesses:
CHRISTIAN MÖLLER,
EDWARD J. KOHLSAAT.